United States Patent
Patel et al.

(10) Patent No.: US 12,244,605 B2
(45) Date of Patent: Mar. 4, 2025

(54) SYSTEM AND METHOD FOR GEOTAGGING USERS FOR AUTHENTICATION

(71) Applicant: Bank of America Corporation, Charlotte, NC (US)

(72) Inventors: Vinesh Premji Patel, London (GB); Michael R. Young, Davidson, NC (US); Manu J. Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 412 days.

(21) Appl. No.: 17/733,533

(22) Filed: Apr. 29, 2022

(65) Prior Publication Data
US 2023/0353579 A1    Nov. 2, 2023

(51) Int. Cl.
H04L 9/40       (2022.01)
G06T 13/40      (2011.01)
H04L 67/52      (2022.01)

(52) U.S. Cl.
CPC ............ *H04L 63/107* (2013.01); *G06T 13/40* (2013.01); *H04L 67/52* (2022.05)

(58) Field of Classification Search
None
See application file for complete search history.

(56) References Cited

U.S. PATENT DOCUMENTS

| | | |
|---|---|---|
| 7,904,577 B2 | 3/2011 | Taylor |
| 8,417,822 B2 | 4/2013 | Edecker et al. |
| 8,924,880 B2 | 12/2014 | Altberg et al. |
| 9,531,724 B2 | 12/2016 | Shuster et al. |
| 9,947,139 B2 | 4/2018 | Yasutake |
| 10,068,374 B2 | 9/2018 | Miller et al. |
| 10,115,232 B2 | 10/2018 | Miller et al. |
| 10,203,838 B2 | 2/2019 | Makofsky et al. |
| 10,269,089 B2 | 4/2019 | Lashkari et al. |
| 10,369,474 B2 | 8/2019 | Walling |
| 10,403,050 B1 | 9/2019 | Beall et al. |
| 10,535,196 B2 | 1/2020 | Malamud et al. |
| 10,672,288 B2 | 6/2020 | Ribeira et al. |
| 10,679,411 B2 | 6/2020 | Ziman |
| 10,691,202 B2 | 6/2020 | Van Hoff et al. |
| 10,740,804 B2 | 8/2020 | Spivack et al. |
| 10,862,930 B2 | 12/2020 | Miller |
| 10,901,687 B2 | 1/2021 | Newell et al. |

(Continued)

*Primary Examiner* — Syed A Roni

(57) ABSTRACT

An apparatus for geotagging users for authentication comprises a processor associated with a server. The processor is configured to generate a first geotag based on residence information associated with a first user and to transmit the first geotag to a first user device for assignment to a first avatar associated with the first user in a virtual environment. The processor is further configured to receive an interaction request to authorize an interaction between the first avatar and a second avatar associated with a second user. The processor is further configured to compare a first historical log to a second historical log to determine that the first avatar is associated with the first user. In response to determining that the first avatar is associated with the first user, the processor is further configured to conduct a first step in authorizing the interaction between the first avatar and the second avatar.

20 Claims, 3 Drawing Sheets

(56) References Cited

U.S. PATENT DOCUMENTS

| | | |
|---|---|---|
| 10,905,943 B2 | 2/2021 | Perry |
| 10,922,890 B1 | 2/2021 | Pusch et al. |
| 10,931,941 B2 | 2/2021 | Valdivia et al. |
| 10,944,802 B2 | 3/2021 | Van Wie et al. |
| 10,974,136 B2 | 4/2021 | Perry |
| 11,086,474 B2 | 8/2021 | Lee et al. |
| 11,195,333 B2 | 12/2021 | Altieri |
| 11,207,598 B2 | 12/2021 | Thomas et al. |
| 11,249,714 B2 | 2/2022 | Spivack et al. |
| 2011/0010675 A1* | 1/2011 | Hamilton, II ......... A63F 13/335 715/850 |
| 2018/0349703 A1 | 12/2018 | Rathod |
| 2019/0107935 A1 | 4/2019 | Spivack et al. |
| 2019/0108558 A1 | 4/2019 | Spivack et al. |
| 2019/0295056 A1 | 9/2019 | Wright |
| 2020/0294097 A1 | 9/2020 | Spivack et al. |
| 2020/0368616 A1 | 11/2020 | Delamont |
| 2021/0185105 A1 | 6/2021 | Van Wie et al. |
| 2021/0241532 A1 | 8/2021 | Daniels et al. |

\* cited by examiner

SYSTEM AND METHOD FOR GEOTAGGING USERS FOR AUTHENTICATION

TECHNICAL FIELD

The present disclosure relates generally to network communications and information security. More particularly, in certain embodiments, the present disclosure is related to a system and method for geotagging users for authentication.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access other users' information.

SUMMARY

The disclosed system provides several practical applications and technical advantages that overcome the previously discussed technical problems. The following disclosure provides a practical application of a server that is configured as an information security device for a virtual environment. The disclosed information security device provides practical applications that improve the information security of the virtual environment by authenticating a user in the real world and an avatar that is associated with the user in a virtual environment, such as in the metaverse, through geotagging. This process provides a technical advantage that increases information security because it inhibits a bad actor from attempting to impersonate the user in a virtual environment as the associated avatar. This process may be employed to authenticate and validate the identity of a user before allowing the user to perform any kind of action or interaction within a virtual environment.

In an embodiment, an apparatus for geotagging users for authentication comprises a memory and a processor. The memory is configured to store residence information associated with a first user in an account. The memory is further configured to store a first historical log comprising physical locations of the first user in a real-world environment and to store a second historical log comprising virtual locations of a first avatar associated with the first user in a virtual environment, wherein the physical locations in the real-world environment correlate to the virtual locations in the virtual environment. The processor is configured to generate a first geotag based on the stored residence information and to transmit the first geotag to a first user device associated with the first user for assignment to the first avatar in the virtual environment. The processor is further configured to receive an interaction request to authorize an interaction in the virtual environment between the first avatar and a second avatar associated with a second user and to compare the first historical log to the second historical log to determine that the first avatar is associated with the first user. In response to determining that the first avatar is associated with the first user, the processor is configured to conduct a first step in authorizing the interaction between the first avatar and the second avatar.

The disclosed system may further be integrated into an additional practical application of improving underlying operations of computing systems tasked to initiate and conduct interaction sessions with one or more users. For example, the disclosed system may reduce processing, memory, and time resources of a user device for identifying and validating a given user for each potential interaction. A separate server may analyze user device information associated with a user device of each user to determine a location of that user and then may authorize an interaction session based on approval of generated geotags.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
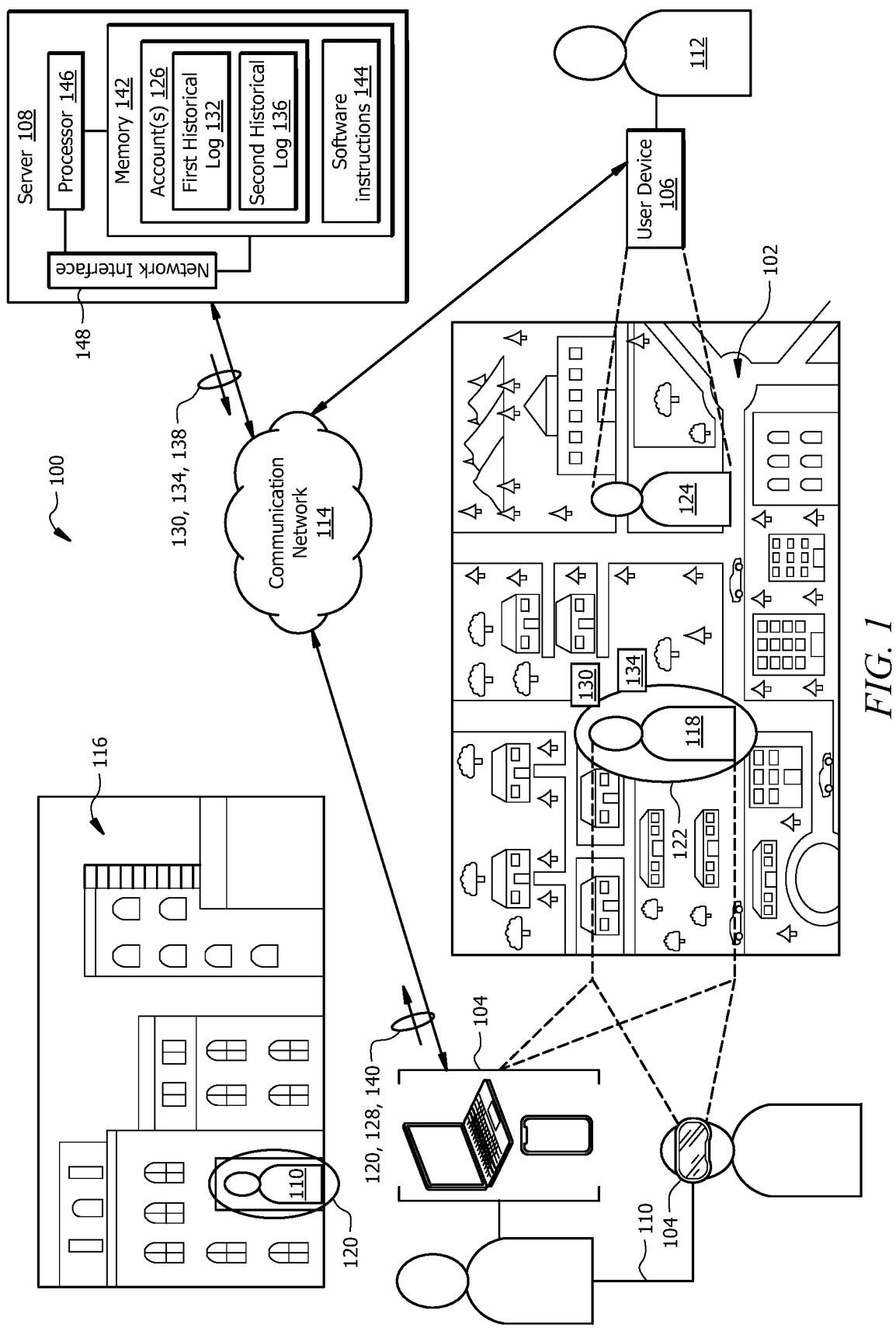
FIG. 1 is a schematic diagram of an example system for geotagging users for authentication.
Figure 2:
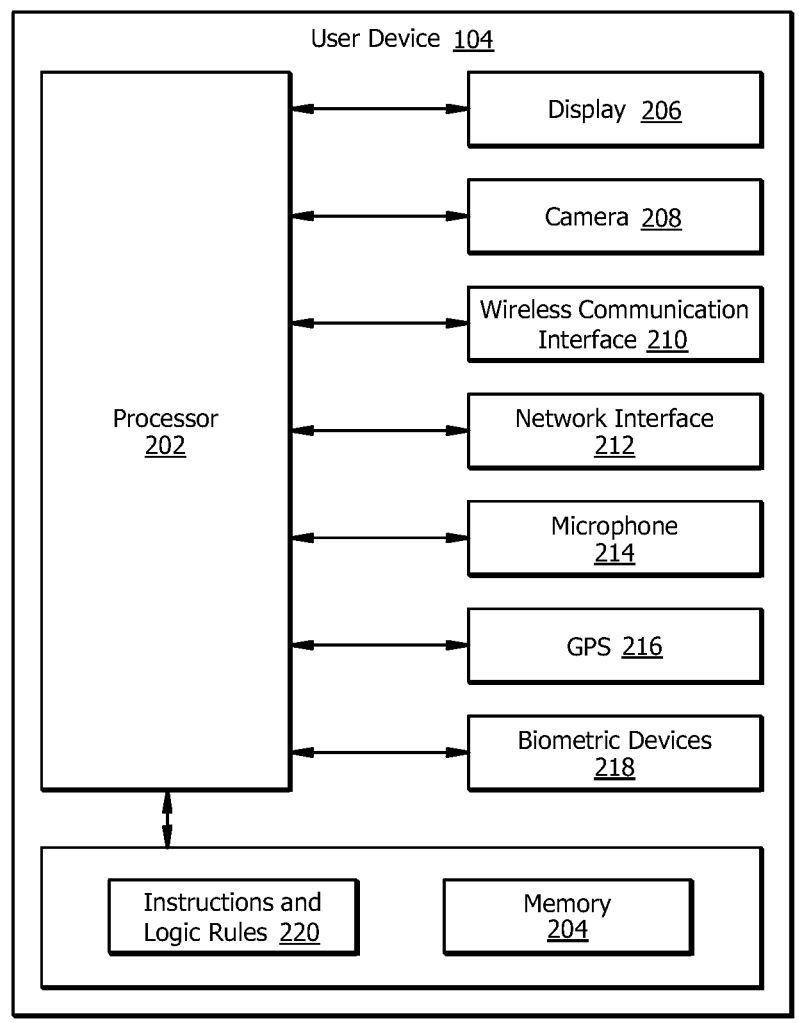
FIG. 2 is a block diagram of an example user device of the system of FIG. 1.
Figure 3:
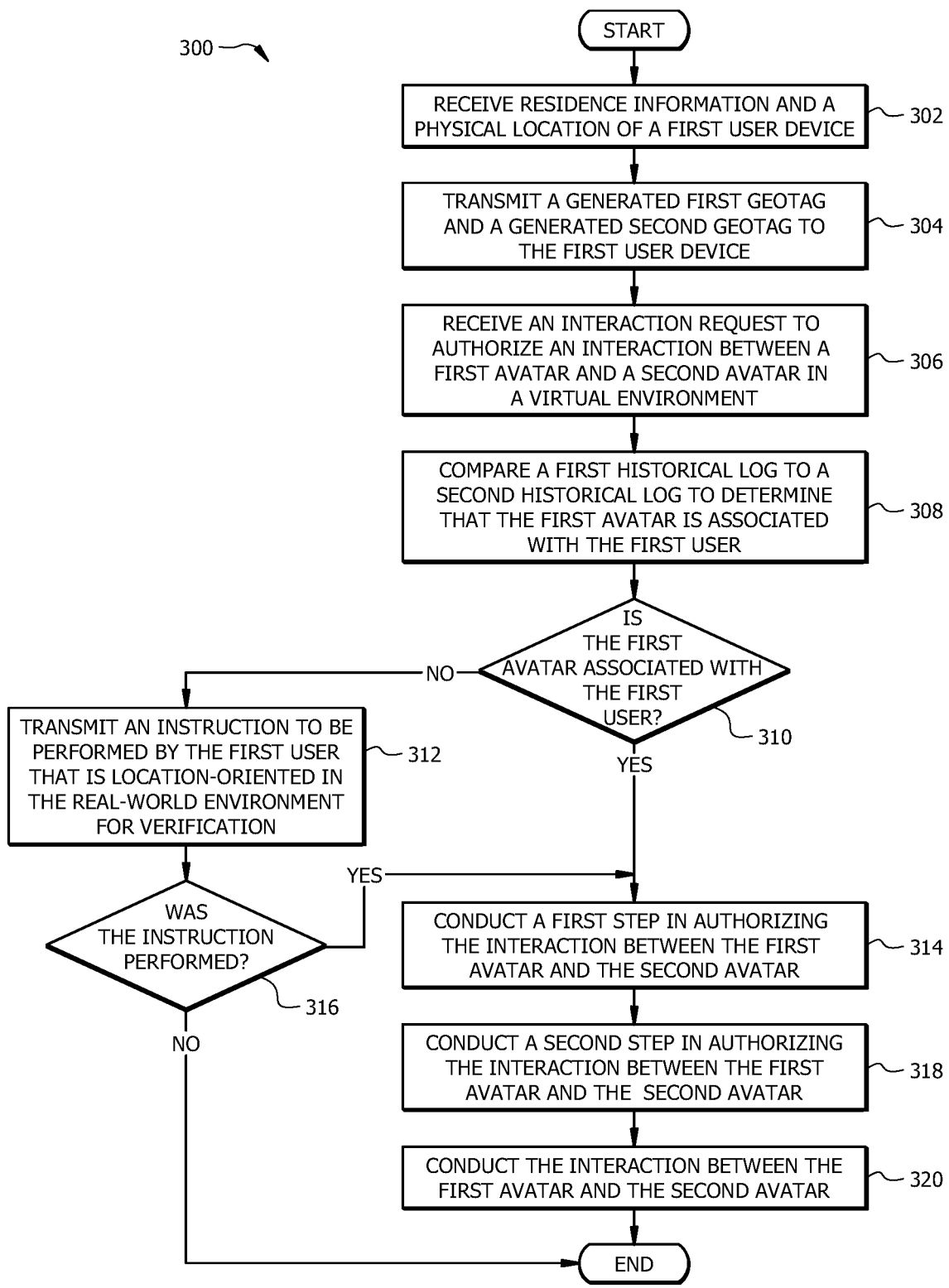
FIG. 3 is a flow diagram illustrating an example operation of the system of FIG. 1.

This disclosure provides solutions to the aforementioned and other problems of previous technology by geotagging users for authentication for an interaction. FIG. 1 is a schematic diagram of an example system for geotagging users for authentication. FIG. 2 is a block diagram of an example user device of the system of FIG. 1. FIG. 3 is a flow diagram illustrating an example operation of the system of FIG. 1.

Example System for Geotagging Users for Authentication

FIG. 1 illustrates a schematic diagram of an example system 100 that is generally configured to provide information security to users within a virtual environment 102 by geotagging the users for authentication. The system 100 may include a first user device 104, a second user device 106, and a server 108. A first user 110 is associated with the first user device 104 and a second user 112 is associated with the second user device 106. The system 100 may be communicatively coupled to a communication network 114 and may be operable to transmit data between each one of the first user device 104, second user device 106, and the server 108 through the communication network 114. In general, the system 100 may improve electronic interaction technologies by geotagging the first user 110 in a real-world environment 116 for authentication prior to an interaction with the second user 112 in the virtual environment 102. This process may be employed to authenticate the first user 110 before allowing the first user 110 to perform any kind of action or interaction within the virtual environment 102. This process provides improved information security because it relies on a combination of factors that are associated with both the first user 110 in the real-world 116 and a first avatar 118 that is associated with the first user 110 in the virtual environment 102.

For example, in a particular embodiment, a user (for example, the first user 110) may be located at a physical location 120 in the real-world environment 116. The physical location 120 of the first user 110 may be determined based on a proximity to the first user device 104. In embodiments, a location of the first user device 104 may be determined through the global positioning system (GPS), an internet protocol (IP) address connected to a local computer network, or a combination thereof. While at any location in the real-world environment 116, the first user 110 may attempt to access the virtual environment 102, wherein locations in the virtual environment 102 can be correlated to physical locations 120 in the real-world environment 116 (for example, if the first user 110 is in Paris, France, the virtual environment 102 may be rendered to display a representation of the Eiffel Tower).

The first user 110 may access the virtual environment 102 through the first user device 104. The first user device 104 is configured to display a two-dimensional (2D) or three-dimensional (3D) representation of the virtual environment 102 to the first user 110. Examples of a virtual environment 102 may include, but are not limited to, a graphical or virtual representation of a metaverse, a map, a building interior, a landscape, a fictional location, an alternate reality, or any other suitable type of location or environment. The virtual environment 102 may be configured to use realistic or non-realistic physics for the motion of objects within the virtual environment 102. For example, some virtual environments 102 may be configured to use gravity whereas other virtual environments 102 may not be configured to use gravity. Within the virtual environment 102, each user may be associated with an avatar (such as the first avatar 118 for the first user 110). An avatar is a graphical representation of the user at a virtual location 122 within the virtual environment 102. In embodiments, the virtual location 122 of the avatar may be correlated to the physical location 120 of a user in the real-world environment 116. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment 102 to interact with one or more avatars and objects within the virtual environment 102 while independently remaining at the physical location 120 or being in transit in the real-world environment 116.

While engaging in the virtual environment 102 via the first avatar 118, the first user 110 may interact with a plurality of other users through a respective avatar. For example, the second user 112 may attempt to engage in an interaction session with the first avatar 118 through a second avatar 124 associated with the second user 112. In the real-world environment 116, the second user 112 may be located at a distance away from the first user 110. The second user 112 may access the virtual environment 102 through the second user device 106 to control the second avatar 124 and attempt to engage in an interaction session with the first user through the first avatar 118.

Before the interaction between the first avatar 118 and second avatar 124 occurs, the server 108 may authenticate that the first avatar 118 is associated with the first user 110 and not some fraudulent third-party. For example, the first user 110 may be required to sign into an account 126 associated with the first user 110, that is stored and managed by the server 108, in order to access the virtual environment 102 through the first user device 104. In embodiments, the server 108 may employ single sign-on (SSO), multifactor authentication, or any other suitable authentication scheme in order to allow the first user 110 access to the account 126. The account 126 may comprise user profile information, account information, avatar information, digital assets information, or any other suitable type of information that is associated with a user within the virtual environment 102 and/or the real-world environment 116.

As the first user 110 initially creates the account 126, the server 108 may request residence information 128 associated with the first user 110. The residence information 128 may include a physical address of a residence of the first user 110, a city, a state, a country, a zip code, and any combination thereof for storage in the account 126 for the first user 110. The server 108 may receive the residence information 128 through user input via the first user device 104. The server 108 may generate a first geotag 130 based on the received residence information 128 for assignment to the first avatar 122 associated with the first user 110, wherein the server 108 may transmit the first geotag 130 to the first user device 104 for display in the virtual environment 102. The first geotag 130 may be operable to convey to another avatar in the virtual environment 102 a residency of the first user 110. The first geotag 130 may be a visual display associated with a particular country based on the residence information 128 of the first user 110, such as a country flag, the name of a country, a country's recognized abbreviation (e.g., US for United States or MX for Mexico), or a combination thereof. For example, the first user device 104 may display the first avatar 122 in the virtual environment 102 with the first geotag 130 in proximity to the first avatar 122.

The server 108 may further identify the physical location 120 of the first user 110 in the real-world environment 116 based on a proximity to the first user device 104. For example, while the first user 110 may reside in one country, the first user 110 may be at a physical location 120 elsewhere in a different country. The first user device 104 may transmit its location to the server 108 through GPS, an IP address connected to a local network, a combination thereof, or through any other suitable means. The server 108 may store the received location from the first user device 104 as the physical location 120 of the first user 110 in a first historical log 132 in the account 126 associated with the first user 110. Based on the received location from the first user device 104, the server 108 may generate a second geotag 134 for assignment to the first avatar 122 associated with the first user 110. The server 108 may transmit the second geotag 134 to the first user device 104 for display in the virtual environment 102. The second geotag 134 may be operable to convey to another avatar in the virtual environment 102 where the first user 110 is located in the real-world environment 116 at a physical location 120. Similar to the first geotag 130, the second geotag 134 may be a visual display associated with a particular country based on the received location from the first user device 104, such as a country flag, the name of a country, a country's recognized abbreviation (e.g., US for United States or MX for Mexico), or a combination thereof. For example, the first user device 104 may display the first avatar 122 in the virtual environment 102 with the second geotag 134 in proximity to the first avatar 122.

As described above, the server 108 may store the received locations from the first user device 104 as the physical locations 120 of the first user 110 in the first historical log 132. The server 108 may further be operable to store the virtual locations 122 of the first avatar 118 as the first avatar 118 interacts within the virtual environment 102. The virtual locations 122 may be stored in a second historical log 136 in the account 126 associated with the first user 110. In embodiments of the present disclosure, the physical locations 120 of the first user 110 correlate to the virtual locations 122 of the first avatar 118. The server 108 may determine that the first avatar 118 is associated with the first user 110 by comparing the first historical log 132 to the second historical log 136. For example, if the first user 110 remains in physical locations 120 within one country for a period of time and the virtual locations 122 of the first avatar 118 are associated to that one country for that same period of time, the server 108 may authenticate the first avatar 118 as being associated with the first user 110 and proceed to authorizing an interaction between the first avatar 118 and another avatar (such as the second avatar 124) in the virtual environment 102.

In an example wherein comparing the first historical log 132 to the second historical log 136 does not authenticate the first avatar 118 as being associated with the first user 110, the server 108 may proceed to transmit an instruction 138 to be performed by the first user 110 that is location-oriented in the real-world environment 116. For example, the instruction 138 may direct the first user 110 to travel a specific route or to go to a specific physical location 120 while logged-in to the virtual environment 102 via the first user device 104. The stored physical locations 120 in the first historical log 132 and the stored virtual locations 122 in the second historical log 136 may update as the first user 110 performs the instruction 138. Upon receiving a signal 140 from the first user device 104 indicating that the instruction 138 was performed by the first user 110, the server 108 may compare the updated first historical log 132 and second historical log 136 to verify that the first avatar 118 is associated with the first user 110 and proceed to authorize an interaction between the first avatar 118 and another avatar.

The server 108 is generally a suitable server (e.g., including a physical server and/or virtual server) operable to store data in a memory 142 and/or provide access to application(s) or other services. The server 108 may be a backend server associated with a particular group that facilitates conducting interactions between entities and one or more users. Details of the operations of the server 108 are described in conjunction with FIG. 3. Memory 142 includes software instructions 144 that, when executed by a processor 146, cause the server 108 to perform one or more functions described herein. Memory 142 may be volatile or non-volatile and may comprise a read-only memory (ROM), random-access memory (RAM), ternary content-addressable memory (TCAM), dynamic random-access memory (DRAM), and static random-access memory (SRAM). Memory 142 may be implemented using one or more disks, tape drives, solid-state drives, and/or the like. Memory 142 is operable to store software instructions 144, the accounts 126, first historical log 132, second historical log 136, residence information 128, and/or any other data or instructions. The software instructions 144 may comprise any suitable set of instructions, logic, rules, or code operable to execute the processor 146. In these examples, the processor 146 may be communicatively coupled to the memory 142 and may access the memory 142 for these determinations.

Processor 146 comprises one or more processors operably coupled to the memory 142. The processor 146 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 146 may be a programmable logic device, a microcontroller, a microprocessor, or any suitable combination of the preceding. The one or more processors are configured to process data and may be implemented in hardware or software. For example, the processor 146 may be 8-bit, 16-bit, 32-bit, 64-bit, or of any other suitable architecture. The processor 146 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instructions 144. In this way, processor 146 may be a special-purpose computer designed to implement the functions disclosed herein. In an embodiment, the processor 146 is implemented using logic units, FPGAs, ASICs, DSPs, or any other suitable hardware. The processor 146 is configured to operate as described in FIGS. 1 and 3. For example, the processor 146 may be configured to perform the steps of method 300 as described in FIG. 3.

As illustrated, the server 108 may further comprise a network interface 148. Network interface 148 is configured to enable wired and/or wireless communications (e.g., via communication network 114). The network interface 148 is configured to communicate data between the server 108 and other devices (e.g., first user device 104, second user device 106, etc.), databases, systems, or domain(s). For example, the network interface 148 may comprise a WIFI interface, a local area network (LAN) interface, a wide area network (WAN) interface, a modem, a switch, or a router. The processor 146 is configured to send and receive data using the network interface 148. The network interface 148 may be configured to use any suitable type of communication protocol as would be appreciated by one of skill in the art.

The communication network 114 may facilitate communication within the system 100. This disclosure contemplates the communication network 114 being any suitable network operable to facilitate communication between the first user device 104, second user device 106, and the server 108. Communication network 114 may include any interconnecting system capable of transmitting audio, video, signals, data, messages, or any combination of the preceding. Communication network 114 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., server 108), databases, etc. through the communication network 114. Each of the user devices may be configured to perform specific functions described herein and interact with server 108, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to the server 108 or to another user device.

Example User Device

FIG. 2 is a block diagram of an embodiment of the first user device 104 used by the system of FIG. 1. First user device 104 may be configured to display the virtual environment 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1). An example of the first user device 104 in operation is described in FIG. 3.

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the server 108 in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect hand gestures, identify virtual objects selected by a detected hand gesture (e.g., identify selected files 116 in FIG. 1), capture biometric information of a user, such as first user 110, via one or more of camera 208, microphone 214, and/or biometric devices 218, and communicate via wireless communication interface 210 with server 108 and/or second user device 106. In some embodiments, the function described herein is implemented using logic units, FPGAs, ASICs, DSPs, or any other suitable hardware or electronic circuitry.

The memory 204 is operable to store any of the information described with respect to FIGS. 1 and 3 along with any other data, instructions, logic, rules, or code operable to implement the function(s) described herein when executed by processor 202. For example, the memory 204 may store the instructions and logic rules 220, which are described below with respect to FIG. 3. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, residence information 128 (referring to FIG. 1), first historical log 132 (referring to FIG. 1), second historical log 136 (referring to FIG. 1), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in an augmented reality environment that overlays virtual or graphical objects onto tangible objects in a real scene in real-time. In other embodiments, the display 206 is configured to present visual information to the user as the virtual environment 102 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display an augmented reality environment with virtual or graphical objects overlaid onto tangible objects in a real scene in real-time and/or virtual environment 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 104 (referring to FIG. 1) or server 108 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Example Operation of the System for Geotagging Users for Authentication

FIG. 3 is a flow diagram illustrating an example method 300 of the system 100 of FIG. 1. The method 300 may be implemented using the first user device 104, second user device 106, and the server 108 of FIG. 1. The method 300 may begin at step 302 where the server 108 may determine a physical location 120 (referring to FIG. 1) of the first user 110 (referring to FIG. 1) from the first user device 104 associated with the first user 110. For example, the first user device 104 may transmit its location to the server 108 through GPS, an IP address connected to a local network, or through any other suitable means. In embodiments, the first user device 104 may transmit its location to the server 108 periodically and/or when the first user 110 is signed into the account 126 (referring to FIG. 1) associated with the first user 110. The server 108 may store the received location from the first user device 104 as the physical location 120 of the first user 110 in the first historical log 132 (referring to FIG. 1) associated with the first user 110. Further, the server 108 may have previously received residence information 128 of the first user 110 from the first user device 104. The server 108 may request confirmation of the accuracy of previously received residence information 128. In other embodiments, the server 108 may not be storing the residence information 128 and may receive the residence information 128 in conjunction with the location of the first user device 104.

At step 304, the processor 146 (referring to FIG. 1) of the server 108 may generate the first geotag 130 based on the residence information 128 of the first user 110. The processor 146 of the server 108 may further generate the second geotag 134 based on the physical location 120 of the first user 110 stored in the first historical log 132. The processor 146 of the server 108 may then transmit the first geotag 130 and the second geotag 134 to the first user device 104 for assignment to the first avatar 118 (referring to FIG. 1) to be displayed in the virtual environment 102 (referring to FIG. 1). For example, each of the first geotag 130 and the second geotag 134 may be displayed in proximity to the first avatar 118 in the virtual environment 102. The first geotag 130 and the second geotag 134 may each be a visual display associated with a particular country based on the residence information 128 and the received location from the first user device 104, respectively. For example, the visual display may be a country flag, the name of a country, a country's recognized abbreviation (e.g., US for United States or MX for Mexico), or a combination thereof.

At step 306, the second avatar 124 (referring to FIG. 1) may request to interact with the first avatar 118 within the virtual environment 102. In embodiments, the second user device 106 may transmit an interaction request to the server 108 in order to request authorization for the first avatar 118 to interact with the second avatar 124. Before the interaction between the first avatar 118 and second avatar 124 occurs, the server 108 may authenticate that the first avatar 118 in the virtual environment 102 is associated with the first user 110 in the real-world environment 116 (referring to FIG. 1) and not some fraudulent third-party.

At step 308, in response to the processor 146 of the server 108 receiving the interaction request from the second user device 106, the processor 146 may access the memory 142 (referring to FIG. 1) to compare the first historical log 132 to the second historical log 136 (referring to FIG. 1) in order to determine that the first avatar 118 is associated with the first user 110 in the real-world environment 116. The second historical log 136 may store the virtual locations 122 (referring to FIG. 1) of the first avatar 118 as the first avatar 118 interacts within the virtual environment 102, wherein the virtual locations 122 in the virtual environment 102 correlate to the physical locations 120 in the real-world environment 116. For example, if the first user 110 is in Paris, France in the real-world environment 116, the virtual environment 102 may be rendered to display a representation of the Eiffel Tower. In an example, if the first user 110 remains in physical locations 120 within one country for a period of time and the virtual locations 122 of the first avatar 118 are associated to that one country for that same period of time, the server 108 may authenticate the first avatar 118 as being associated with the first user 110 and proceed to authorizing an interaction between the first avatar 118 and another avatar (such as the second avatar 124) in the virtual environment 102.

At step 310, the processor 146 may determine whether the first avatar 118 is associated with the first user 110 based on the comparison of the first historical log 132 to the second historical log 136. If the processor 146 determines that the first avatar 118 is not associated with the first user 110, the method 300 proceeds to step 312. Otherwise, the method 300 proceeds to step 314.

At step 312, the processor 146 of the server 108 may transmit the instruction 138 (referring to FIG. 1) to be performed by the first user 110 that is location-oriented in the real-world environment 116 as a secondary measure of authorizing the interaction between the first avatar 118 and second avatar 124. In an example, the server 108 may infrequently store physical locations 120 of the first user 110 and/or virtual locations 122 of the first avatar 118. The instruction 138 may direct the first user 110 to travel a specific route or to go to a specific physical location 120 while logged-in to the virtual environment 102 via the first user device 104. The stored physical locations 120 in the first historical log 132 and the stored virtual locations 122 in the second historical log 136 may update as the first user 110 performs the instruction 138.

At step 316, the processor 146 may determine whether the instruction 138 was performed by the first user 110 based on reception of a return signal 140 from the first user device 104 indicating completion of the instruction 138. Upon receiving the signal 140 from the first user device 104, the processor 146 of the server 108 may compare the updated first historical log 132 and second historical log 136 to verify that the first avatar 118 is associated with the first user 110 and proceed with authorizing the interaction request. If the processor 146 does not receive the return signal 140, the method 300 proceeds to end. Otherwise, the method 300 proceeds to step 314.

At step 314, the processor 146 may proceed to conduct a first step in authorizing the interaction between the first avatar 118 and the second avatar 124. The first step in authorizing the interaction may comprise of verifying that the first geotag 130 is acceptable for the interaction. For example, authorization of the interaction may be dependent on where the first user 110 resides in the real-world environment 116 based on the provided residence information 128. In an example, the first user 110 may reside in a country not authorized to participate in interactions via the server 108 (i.e., sanctions). The server 108 may be operable to verify whether the first user 110 may proceed to conduct interactions in the virtual environment 102 by analyzing the provided residence information 128.

At step 318, the processor 146 may proceed to conduct a second step in authorizing the interaction between the first avatar 118 and the second avatar 124. The second step in authorizing the interaction may comprise verifying that the first user 110 is at the physical location 120 associated with the second geotag 134 and verifying that the second geotag 134 is acceptable for the interaction. For example, the first user 110 may utilize devices, such as a virtual private network, to route the first user 110 to a network at a different physical location 120. In this example, the first user 110 may appear to be functionally operating at a different physical location 120 than where the first user 110 is actually located. As a result, the generated second geotag 134 may be inaccurate. The server 108 may request the first user device 104 to transmit its location to the server 108 through GPS, an IP address connected to a local network, or through any other suitable means to verify that the physical location of the first user device 104 corresponds to the generated second geotag 134. Then, the processor 146 may determine that the second geotag 134 is acceptable for the interaction. Similar to step 314, authorization of the interaction may be dependent on a physical location 120 of the first user 110 in the real-world environment 116. In this example, the first user 110 may be temporarily located in a country not authorized to participate in interactions via the server 108 (i.e., sanctions). The server 108 may be operable to verify whether the first user 110 may proceed to conduct interactions in the virtual environment 102 by analyzing the physical location 120 of the first user 110.

At step 320, the processor 146 of the server 108 may conduct the requested interaction between the first avatar 118 and the second avatar 124. The processor 146 may be in signal communication with the first user device 104 and the second user device 106 and may facilitate the interaction therebetween based on actions of the first avatar 118 and the second avatar 124. For example, the second avatar 124 may request to transfer an asset stored in an account 126 associated with the second user 112 in exchange for an asset stored in the account 126 associated with the first user 110. The server 108 may conduct the interaction and transmit signals to the first user device 104 and the second user device 106 indicating that the interaction has occurred. After conducting the interaction, the method 300 proceeds to end.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus for geotagging users for authentication, comprising:
   a memory operable to:
     store residence information associated with a first user in an account;
     store a first historical log comprising physical locations of the first user in a real-world environment; and
     store a second historical log comprising virtual locations of a first avatar associated with the first user in a virtual environment, wherein the physical locations in the real-world environment correlate to the virtual locations in the virtual environment; and
   a processor, operably coupled to the memory, configured to:
     generate a first geotag based on the stored residence information, wherein the first geotag is a visual display associated with a country corresponding to the stored residence information;
     transmit the first geotag to a first user device associated with the first user for assignment to the first avatar in the virtual environment, wherein the first geotag is configured to be visually displayed in proximity to the first avatar in the virtual environment;
     receive a signal from the first user device indicating a location associated with the first user;
     generate a second geotag based on the location from the received signal, wherein the second geotag is a visual display associated with a country corresponding to the location from the received signal;
     transmit the second geotag to the first user device for assignment to the first avatar in the virtual environment, wherein the second geotag is configured to be visually displayed in proximity to the first avatar in the virtual environment;
     receive an interaction request to authorize an interaction in the virtual environment between the first avatar and a second avatar associated with a second user;
     compare the first historical log to the second historical log to determine that the first avatar is associated with the first user, wherein the first avatar is associated with the first user when the physical locations of the first historical log correspond to the virtual locations of the second historical log during a period of time;
     in response to determining that the first avatar is associated with the first user, conduct a first step in authorizing the interaction between the first avatar and the second avatar;
     determine whether the second geotag is acceptable for the interaction during a second step in authorizing the interaction between the first avatar and the second avatar; and
     in response to determining that the second geotag is acceptable, authorize the interaction request and facilitate the interaction between the first avatar and the second avatar.

2. The apparatus of claim 1, wherein the processor is further configured to:
   transmit an instruction to be performed by the first user that is location-oriented in the real-world environment;
   receive a signal from the first user device indicating that the instruction was performed; and
   conduct the first step in authorizing the interaction between the first avatar and the second avatar in response to a determination that the instruction was performed.

3. The apparatus of claim 1, wherein the first step in authorizing the interaction comprises verifying that the first geotag is acceptable for the interaction.

4. The apparatus of claim 1, wherein the processor is further configured to:
   identify a physical location of the first user.

5. The apparatus of claim 4, wherein the processor is further configured to:
   conduct the second step in authorizing the interaction between the first avatar and the second avatar based on verification that the first user is at the physical location associated with the second geotag; and
   conduct the interaction between the first avatar and the second avatar.

6. The apparatus of claim 1, wherein the processor is further configured to:
   receive the residence information based on user input from the first user device.

7. The apparatus of claim 1, wherein the processor is further configured to:
   receive a signal indicating a physical location of the first user device; and
   instruct the memory to store each signal received that indicates the physical location of the first user device in the first historical log.

8. A method for geotagging users for authentication, comprising:
   generating a first geotag based on residence information associated with a first user, wherein the first geotag is a visual display associated with a country corresponding to the residence information;
   transmitting the first geotag to a first user device associated with the first user for assignment to a first avatar associated with the first user in a virtual environment, wherein the first geotag is configured to be visually displayed in proximity to the first avatar in the virtual environment;
   receiving a signal from the first user device indicating a location associated with the first user;
   generating a second geotag based on the location from the received signal, wherein the second geotag is a visual display associated with a country corresponding to the location from the received signal;
   transmitting the second geotag to the first user device for assignment to the first avatar in the virtual environment, wherein the second geotag is configured to be visually displayed in proximity to the first avatar in the virtual environment;
   receiving an interaction request to authorize an interaction in the virtual environment between the first avatar and a second avatar associated with a second user;
   comparing a first historical log to a second historical log to determine that the first avatar is associated with the first user, wherein the first historical log comprises physical locations of the first user in a real-world environment, wherein the second historical log comprises virtual locations of the first avatar in the virtual environment, wherein the physical locations in the real-world environment correlate to the virtual locations in the virtual environment, wherein the first avatar is associated with the first user when the physical locations of the first historical log correspond to the virtual locations of the second historical log during a period of time;

in response to determining that the first avatar is associated with the first user, conducting a first step in authorizing the interaction between the first avatar and the second avatar;

determining whether the second geotag is acceptable for the interaction during a second step in authorizing the interaction between the first avatar and the second avatar; and in response to determining that the second geotag is acceptable, authorizing the interaction request and facilitating the interaction between the first avatar and the second avatar.

9. The method of claim 8, further comprising:

transmitting an instruction to be performed by the first user that is location-oriented in the real-world environment;

receiving a signal from the first user device indicating that the instruction was performed; and conducting the first step in authorizing the interaction between the first avatar and the second avatar in response to a determination that the instruction was performed.

10. The method of claim 8, wherein the first step in authorizing the interaction comprises verifying that the first geotag is acceptable for the interaction.

11. The method of claim 8, further comprising:

identifying a physical location of the first user.

12. The method of claim 11, further comprising:

conducting the second step in authorizing the interaction between the first avatar and the second avatar based on verification that the first user is at the physical location associated with the second geotag; and conducting the interaction between the first avatar and the second avatar.

13. The method of claim 8, further comprising receiving the residence information based on user input from the first user device associated with the first user.

14. The method of claim 8, further comprising:

receiving a signal indicating a physical location of the first user device; and storing each signal received that indicates the physical location of the first user device in the first historical log.

15. A non-transitory computer-readable medium comprising instructions that are configured, when executed by a processor, to:

generate a first geotag based on residence information associated with a first user, wherein the first geotag is a visual display associated with a country corresponding to the residence information;

transmit the first geotag to a first user device associated with the first user for assignment to a first avatar associated with the first user in a virtual environment, wherein the first geotag is configured to be visually displayed in proximity to the first avatar in the virtual environment;

receive a signal from the first user device indicating a location associated with the first user;

generate a second geotag based on the location from the received signal, wherein the second geotag is a visual display associated with a country corresponding to the location from the received signal;

transmit the second geotag to the first user device for assignment to the first avatar in the virtual environment, wherein the second geotag is configured to be visually displayed in proximity to the first avatar in the virtual environment;

receive an interaction request to authorize an interaction in the virtual environment between the first avatar and a second avatar associated with a second user;

compare a first historical log to a second historical log to determine that the first avatar is associated with the first user, wherein the first historical log comprises physical locations of the first user in a real-world environment, wherein the second historical log comprises virtual locations of the first avatar in the virtual environment, wherein the physical locations in the real-world environment correlate to the virtual locations in the virtual environment, wherein the first avatar is associated with the first user when the physical locations of the first historical log correspond to the virtual locations of the second historical log during a period of time;

conduct a first step in authorizing the interaction between the first avatar and the second avatar in response to determining that the first avatar is associated with the first user;

determine whether the second geotag is acceptable for the interaction during a second step in authorizing the interaction between the first avatar and the second avatar; and in response to determining that the second geotag is acceptable, authorize the interaction request and facilitate the interaction between the first avatar and the second avatar.

16. The non-transitory computer-readable medium of claim 15, wherein the instructions are further configured to:

transmit an instruction to be performed by the first user that is location-oriented in the real-world environment;

receive a signal from the first user device indicating that the instruction was performed; and conduct the first step in authorizing the interaction between the first avatar and the second avatar in response to a determination that the instruction was performed.

17. The non-transitory computer-readable medium of claim 15, wherein the first step in authorizing the interaction comprises verifying that the first geotag is acceptable for the interaction.

18. The non-transitory computer-readable medium of claim 15, wherein the instructions are further configured to:

identify a physical location of the first user.

19. The non-transitory computer-readable medium of claim 18, wherein the instructions are further configured to:

conduct the second step in authorizing the interaction between the first avatar and the second avatar based on verification that the first user is at the physical location associated with the second geotag; and conduct the interaction between the first avatar and the second avatar.

20. The non-transitory computer-readable medium of claim 15, wherein the instructions are further configured to:

receive a signal indicating a physical location of the first user device; and instruct a memory, operably coupled to the processor, to store each signal received that indicates the physical location of the first user device in the first historical log.

\* \* \* \* \*